(12) United States Patent
Bruschi

(10) Patent No.: US 7,140,858 B2
(45) Date of Patent: Nov. 28, 2006

(54) APPARATUS AND PROCESS FOR INJECTION MOLDING ARTICLES OF PLASTICS MATERIAL

(75) Inventor: Mario Bruschi, Bollate (IT)

(73) Assignee: John Palmer Corp., East Brunswick, NJ (US)

( * ) Notice: Subject to any disclaimer, the term of this patent is extended or adjusted under 35 U.S.C. 154(b) by 662 days.

(21) Appl. No.: 10/630,979

(22) Filed: Jul. 31, 2003

(65) Prior Publication Data

US 2004/0086590 A1    May 6, 2004

(30) Foreign Application Priority Data

Jul. 31, 2002    (IT)    ........................ MI2002A1710

(51) Int. Cl.
  *B29C 45/16*    (2006.01)
(52) U.S. Cl. ............... 425/130; 425/559; 425/562; 425/566; 425/574; 425/576; 264/572; 264/297.3
(58) Field of Classification Search ............... 425/130, 425/559, 562, 566, 574–576; 264/572, 297.3
See application file for complete search history.

(56) References Cited

U.S. PATENT DOCUMENTS

| | | | |
|---|---|---|---|
| 3,973,891 A | 8/1976 | Yamada | |
| 4,613,475 A * | 9/1986 | Hettinga | ............... 425/574 |
| 5,204,050 A | 4/1993 | Loren | |
| 5,286,186 A | 2/1994 | Brown et al. | |
| 5,306,134 A * | 4/1994 | Gill | ............... 425/566 |
| 5,843,485 A * | 12/1998 | Fernandez et al. | ........... 425/130 |

FOREIGN PATENT DOCUMENTS

| | | |
|---|---|---|
| EP | 0 876 891 A1 | 11/1998 |
| JP | 09-85772 A | 3/1997 |

* cited by examiner

*Primary Examiner*—Yogendra N. Gupta
*Assistant Examiner*—Thu Khanh T. Nguyen
(74) *Attorney, Agent, or Firm*—Browdy and Neimark, PLLC

(57) ABSTRACT

It is provided an apparatus for injection molding articles of plastics material comprising: molds (2a) and countermolds (2b) forming molding units (3), molding cavities (7) being defined inside said molds and countermolds; one injection assembly (8) and one auxiliary assembly (9) adapted to respectively supply melted plastics material and pressurized fluid into the molding cavities; molding units (3) being movable with respect to said injection assembly (8) and auxiliary assembly (9); and removable connecting devices (12, 8a), and check means (20) adapted to avoid counter flows from molding cavities (7), being provided between molding units (3) and injection assembly (8) and auxiliary assembly (9).

11 Claims, 3 Drawing Sheets

APPARATUS AND PROCESS FOR INJECTION MOLDING ARTICLES OF PLASTICS MATERIAL

FIELD OF THE INVENTION

The invention refers to an apparatus and process for injection molding articles of plastics material, particularly an apparatus and process for manufacturing articles of plastics materials having an outer layer structurally different from the inner part.

DESCRIPTION OF THE PRIOR ART

As it is known, it is widely used a particular kind of injection molding for manufacturing different articles and objects provided with an outer layer made of a proper plastics material and an inner hollow core.

This molding comprises a number of steps of: supplying a selected quantity of a melted plastics material, immediately after supplying a high pressure fluid so that said fluid drives and compels the plastics material against the mold surfaces, keeping this state for a time sufficient to set the plastics material. Finally, the pressurized fluid is discharged. Discharge is performed before opening the mold for demolding a molded article.

Pressurized fluid for forming hollow articles can be a gas, such as air or nitrogen, or a liquid, such as water.

Referring particularly to substantially hollow articles, said molding offers two advantages: it is possible to manufacture structures which are both lightweight and inexpensive, despite the use of a valuable plastics material.

Indeed, it is sufficient a relatively small quantity of this plastics material because it is distributed only as an outer layer of the molded articles.

This kind of molding shows other advantages.

It allows to optimally distribute the plastics material in the molding cavity, even though it is injected from only one location.

It is also possible to manufacture the thinner portions of the molded articles, indeed the plastics material is compelled to perfectly enter every recess of the mold.

Every part on the surface of these articles shows the same excellent surface finish, moreover every part of the molding cavity of the molds is subjected to uniform pressures.

The procedure and equipment used for molding said articles show, despite these advantages, the severe disadvantage of a low production rate. Indeed, while the first two steps are carried out one after the other in a short period of time, the third step of setting the plastics material compelled along the periphery of molding cavity by the pressurized fluid takes a lot of time because of a slow cooling and due to the fact the cooling time cannot be shortened.

Indeed, the longer step for cooling and setting the plastics material contained in the mold is, the fewer local shrinkages of the plastics material will appear when it is demolded. Moreover, the longer this step lasts, the smoother plastics surfaces will be because they will take the finish surface of the molding cavity.

Briefly, the retention time of the plastics material inside the pressurized mold determines the quality level and finish of the products.

The extended residence time of the plastics material in the molds determines also high cost of the molding plants when it is necessary to increase the production levels.

The cost depends on the fact that must be provided many molding stations simultaneously operating, alternatively large apparatus must be provided capable of operating at the same time a number of molds.

In other words, the prior art in order to obtain high production levels and/or suitable plant cost, must minimize the cooling time of the plastics material in the molds and/or the number of operating molding apparatus in view of the minimum required quality level of the molded articles determined from time to time by the specific articles to be obtained.

In this field, it is still widely used another kind of molding for obtaining an outer layer structurally different from the inner part.

This kind of molding is called bicomponent molding, which forms an outer layer made of valuable material and an inner core made of inexpensive plastics material. Therefore the articles do not have hollow parts, however the cost of the plastics material is kept low even though the outer appearance shows a high level quality.

This molding comprises the steps of supplying a predetermined quantity of melted plastics material adapted to form the outer layer, then supplying a second melted plastics material in order to drive and compel the former against the mold surfaces.

This kind of molding does not require long cooling and setting times with the molds in a closed condition. Another advantage of this molding consists of using a plastics material inside the articles that acts not just as a simple filler but also confers maximum solidity to the articles.

Unfortunately the bicomponent molding is not capable of manufacturing articles as light as the hollow articles.

Moreover, the surface finish of the articles manufactured accordingly is basically inferior because the plastics material used as filler does not have a pressure as high as the pressure of the fluid used to form hollow articles. Therefore, there is still the technical problem of performing quickly at low cost molding processes capable of obtaining the same quality level of the hollow articles.

SUMMARY OF THE INVENTION

Under these circumstances, the object of the present invention is to remedy the disadvantages of the prior art and to solve said technical problem. Said object is achieved by an apparatus for injection molding articles of plastics material comprising: molds and countermolds forming a plurality of molding units, molding cavities being defined inside molds and countermolds; at least one injection assembly and at least one auxiliary assembly adapted to respectively supply melted plastics material and pressurized fluid into said molding cavities; said molding units being movable with respect to said injection assembly and auxiliary assembly; and removable connecting devices being provided between said molding units and said injection assembly and said auxiliary assembly; and check means adapted to avoid counter flows from said molding cavities.

BRIEF DESCRIPTION OF THE DRAWINGS

Other features and advantages will be better understood from the following detailed description of a molding apparatus and process according to the invention shown in the attached drawings, wherein.

DESCRIPTION OF THE PREFERRED EMBODIMENTS

In said Figures, the apparatus according to the invention has been generally shown by the reference number 1, referring to an embodiment of the same for forming hollow articles provided with only one outer layer.

Apparatus 1 substantially comprises a plurality of molds 2a and countermolds 2b reciprocally movable from an open to a closed condition and forming together a plurality of molding units 3.

Figure 1:
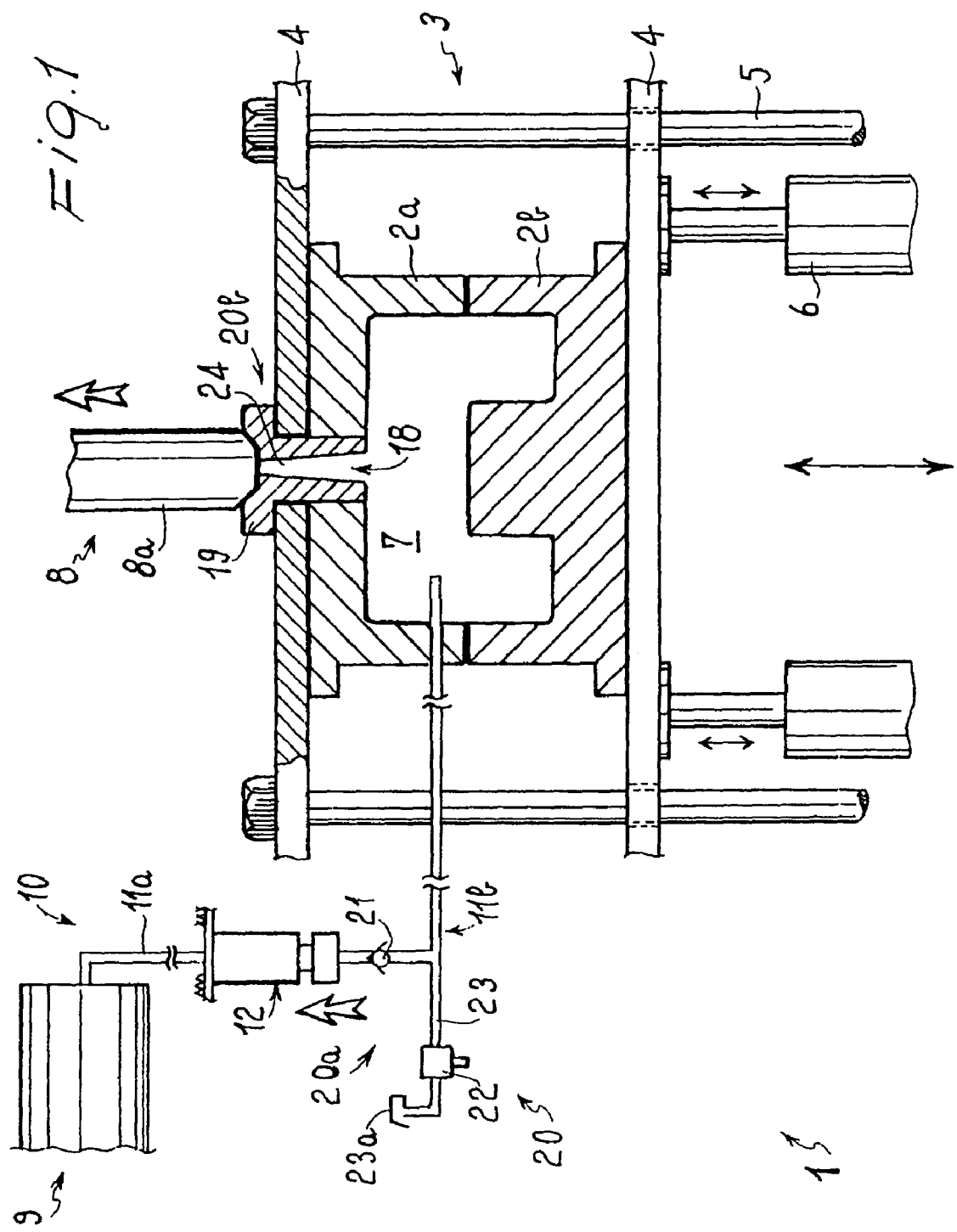
FIG. 1 is a simplified partial cross-section front view of a portion of the apparatus.

As schematically shown in FIG. 1, the mold 2a and countermold 2b of each molding unit 3 are associated to plates 4 respectively which in turn are slidably connected to each other by studs 5. The opening and closing operations are performed by pistons 6.

In the closed position, each pair of mold 2a and countermold 2b defines at least one molding cavity 7 having the shape of the article to be molded in plastics material.

Figure 3:
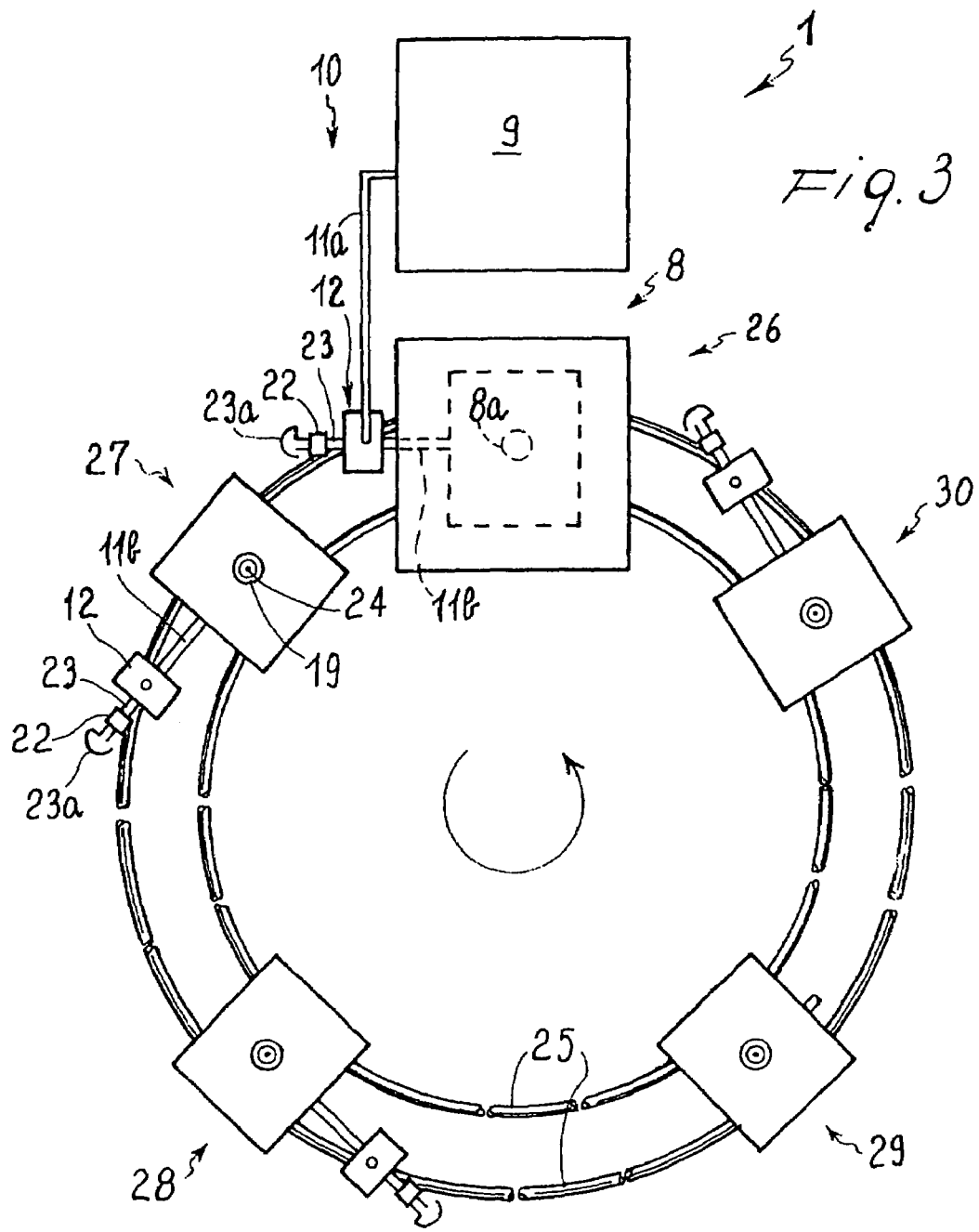
FIG. 3 is a simplified plan view of whole apparatus.

The plastics material is supplied in melted state by an injection assembly 8 which is known per se (FIG. 3).

The molding is of the kind known as "gas assisted" molding, in other words, after the plastics material injection, a pressurized fluid is injected, such as gas comprising air, nitrogen, etc. This gas is supplied at a very high pressure inside the melted plastics material so that the latter is compressed against the periphery of the molding cavity 7.

To this end it is provided an auxiliary assembly 9 delivering pressurized fluid. This auxiliary assembly 9 is known per se known and it is schematically shown in FIG. 3.

Molding units 3 are relatively movable with respect to injection assembly 8 and auxiliary assembly 9 and removable connecting devices are provided. Indeed, referring to auxiliary assembly 9, feeding ducts 10 defined between each molding cavity 7 and auxiliary assembly 9, comprise initial segments 11a engaged with the auxiliary assembly 9 and final segments 11b engaged with molding unit 3, which segments 11a and 11b are removably engaged to each other by means of removable connecting devices embodied by a quick-connection device 12.

Figure 2:
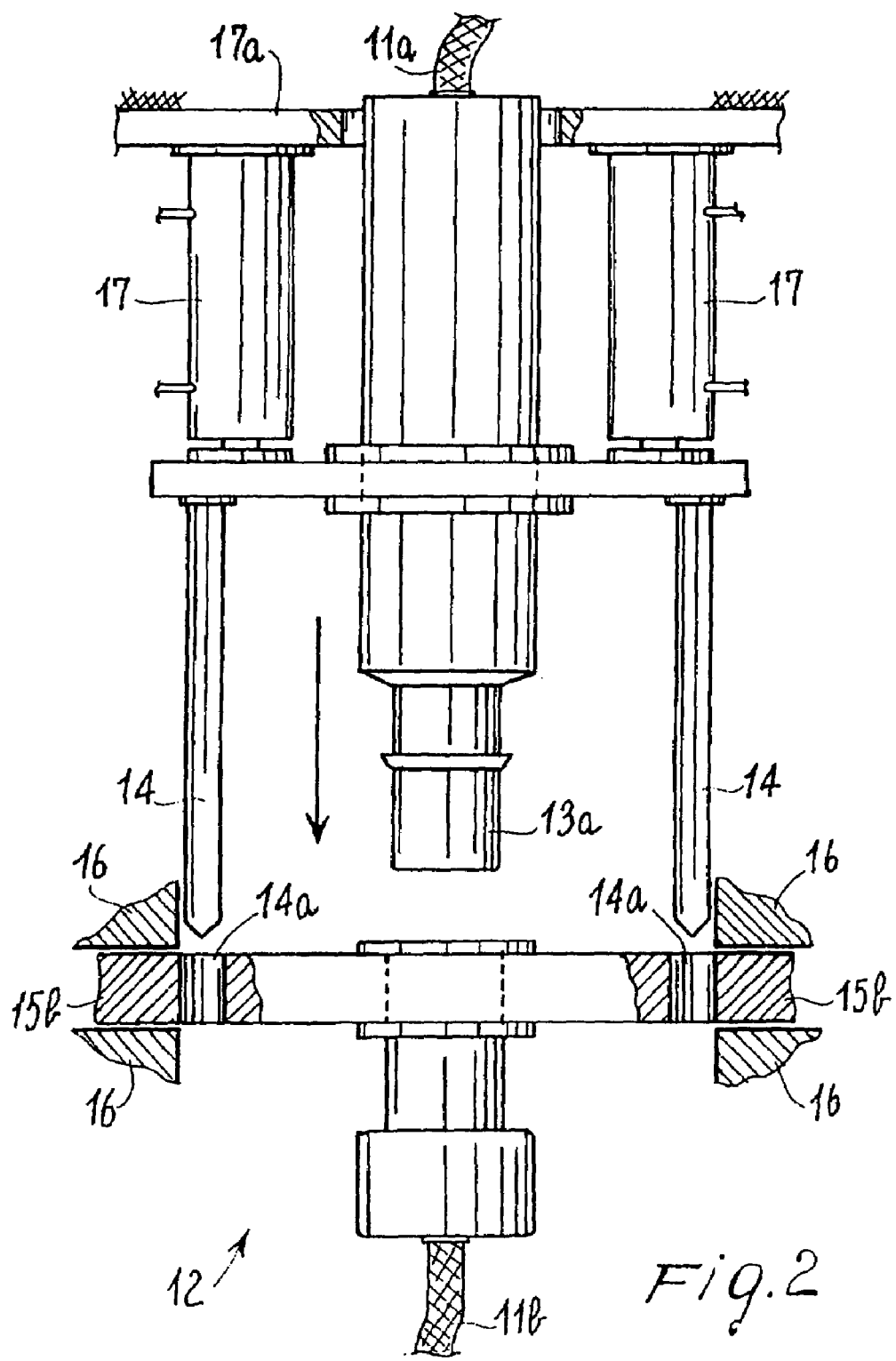
FIG. 2 is a detail of FIG. 1.

This quick-connection device 12 can have different structures and an exemplary embodiment is shown in FIG. 2.

FIG. 2 shows that a male coupling 13a, connected to initial segments 11a, can be sealingly inserted into a female coupling 13b connected to final segments 11b.

Both couplings 13a, 13b are guided by centering studs 14 integral with male coupling 13a and connected to it by a first plate 15a.

Female coupling 13b is in turn integral with a second plate 15b which is provided with centering holes 14a receiving centering studs 14. Second plate 15b is removably received between stationary stops 16 and first plate 15a is controlled to move male coupling 13a until it sealingly engages female coupling 13b.

The movement is resulted by two small pistons 17 supported by a stationary support element 17a and both acting on first plate 15a.

Both couplings are also respectively disengaged by pistons 17.

Other quick-connection devices are known. For example one of these devices can be an "automatic coupler" manufactured by Enerpac Automatic Systems (Milwaukee, Wis., U.S.A.) or a quick-connection coupling manufactured by Stäaubli Italia S.p.A., Divisione Raccordi (Carate Brianza, Milano, Italia). Injection assembly 8 can be made in order to be capable to deliver only one or more plastics materials adapted to form two layers one inside the other. When only one plastics material is delivered, as shown (FIG. 1), supplying channels 18 are provided between each molding cavity 7 and injection assembly 8.

Removable connecting devices between injection assembly 8 and molding units 3 are formed by a movable injector 8a forming the end portion of injection assembly 8.

Indeed, at each injection, movable injector 8a can be located on an opening made in a sleeve 19 surrounding the inlet of each supplying channels 18 of each molding unit 3.

In FIG. 1, a single basal injection is defined by sleeve 19, that is a single injection point for introducing plastics material perpendicularly to one of the major surfaces of molding cavity 7.

Then molding units 3 are associated to check means 20 avoiding counter flows from molding cavities 7.

Check means 20 comprises shut-off devices 20a adapted to keep the pressurized fluid inside molding cavity 7 or one-way elements 20b for keeping plastics material inside molding cavity 7.

Shut-off devices 20a are located in final segments 11b of feeding ducts 10 and are movable with final segments 11b and molding units 3 engaged with final segments 11b.

Shut-off devices 20a comprise, as shown in FIG. 1, at least on stop valve 21 adapted to avoid a counter flow of pressurized fluid exiting from molding cavity 7—and allow a flow in the opposite direction—and at least one manually operated valve 22 for discharging the pressurized fluid.

Advantageously, discharge valve 22 is an electrical valve and it is located in its own duct made in a discharge portion 23 branching from final segments 11b.

A guard 23a located at the end of discharge portion 23 avoids damages from discharging pressurized gas.

One-way elements 20b keeping plastics material in molding cavity 7 are inserted in each supplying channels 18, and for example are formed by at least one conical inlet or channel 24 narrowing towards movable injector 8a made in the sleeve.

Plastics material contained in channel 24 quickly cools down and takes the shape of conical plug preventing the still melted pressurized plastics material from escaping from molding cavity 7.

One-way elements 20b can be at least one stop valve of the kind shown by reference 21 and located adjacent sleeve 19.

Preferably, as shown in FIG. 3, injection assembly 8 supplying melted plastics material, and auxiliary assembly 9 supplying pressurized fluid are substantially stationary, while molding units 3 are movable along a substantially closed-loop path 25, for example a circular path. Path 25 is defined by tracks along which molding assemblies 3 are moved.

Working stations comprising plastics material injection and pressurized fluid supplying stations 26, cooling stations 27, 28, 29, pressurized fluid discharging stations and plastics materials demolding stations 30, for example, are located along path 25.

The length of path 25 or the time for travelling it are proportional to the cooling time. The first and last stations 26, 30 are provided near injection assembly 8 and auxiliary assembly 9, where is located the personnel, and a substantial part of the path is for cooling the plastics material in molding units in the presence of the pressurized fluid.

Other arrangements are possible. For example molding units can be substantially reciprocally aligned and stationary, while injection assembly 8 and auxiliary assembly 9 adjacent to stations are movable.

Operation of the apparatus described above mainly as regards structure is as follows.

The injection assembly 8 and the auxiliary assembly 9 operate in a manner per se known: plastics material and fluid, particularly a gas, are injected in molding units 3, the plastics material is compelled by pressure of the fluid in order to precisely adhere to inner surfaces of molding cavity 7.

Injected plastics material can define only one outer layer, or two or more reciprocally overlapped layers, as it is done with the bicomponent molding. Pressurized fluid introduced inside the plastics material forms articles and artifacts provided with an inner cavity.

The presence of the inner cavity can draw the plastics material which almost collapses when the articles are removed before the plastics material has completely cooled and hardened.

Thus, a period of time must elapse between the plastics material injection and the injection units 3 opening, after having discharged the pressurized fluid.

However, molding units 3 do not stay stationary waiting their proper cooling, but they are moved to cooling stations thanks to the quick-connection device 12 and movable injector 8a which can interrupt the supply from feeding ducts 10 and supplying channels 18.

Additionally, the fluid loss from the molding cavity 3 is prevented by check means 20, that is to say shut-off devices 20a located in the feeding ducts 10 and the one-way elements 24 in the supplying channels 18.

The cooling can therefore last a lot of time without interfering with the operation of injection assembly 8 and auxiliary assembly 9 of other molding units 3.

The invention also teaches a new process for injection molding article of plastics material.

The new process comprises at least one initial step for injecting melted plastics material and at least one initial step for introducing a pressurized fluid in the molding cavities defined in molding units.

Afterwards, there are the intermediate steps for cooling and hardening the plastics material contained in the molding cavities with the pressurized fluid, and final steps comprising the articles demolding.

Plastics material and pressurized fluid are kept in the molding units which are then moved in order to carry out some of the said steps, particularly the cooling steps, in a location remote from that of the other steps.

In this way some of the different steps can be carried out substantially at the same time by different molding units.

After the cooling step, a step for discharging the pressurized fluid is carried out before opening the molding units.

It is to be noted that the initial steps of injecting melted plastics material can comprise the formation of more than one substantially concentric layers having different structures: for example a relatively thin outer layer made of a very valuable material and selected according to its appearance and pleasantness to the touch, and an inexpensive inner layer selected according to its physical properties, for example because it is strong to mechanical loads.

The plastics material products manufactured by the present process combine the best features of the hollow articles with the best features of the bicomponent-type articles.

Stated differently, the products manufactured are both lightweight and inexpensive thanks to the inner cavity, moreover the outer layer or crust shows a very detailed appearance, for example smooth and soft, and the inner layer or core located between the crust and cavity shows the greatest strength.

The invention achieves important advantages.

Indeed, a molding apparatus and process have been envisaged which allow to keep for a long period injected plastics material inside the molds with the pressurized fluid, without reducing the productivity and requiring very expensive plants.

Moreover, the cooling step of these molding units can lasts much longer than the standard one for manufacturing articles, in order to obtain a surface finish that is fully satisfactory.

The invention claimed is:

1. Apparatus for injection molding articles of plastics material, characterized in that it comprises: molds (2a) and countermolds (2b) forming a plurality of molding units (3), molding cavities (7) being defined inside said molds and countermolds; at least one injection assembly (8) and at least one auxiliary assembly (9) adapted to respectively supply melted plastics material and pressurized fluid into said molding cavities (7); said molding units (3) being movable with respect to said injection assembly (8) and auxiliary assembly (9); and removable connecting devices (12, 8a), and check means (20) adapted to avoid counter flows from said molding cavities (7), being provided between said molding units (3) and said injection assembly (8) and said auxiliary assembly (9).

2. Apparatus according to claim 1, wherein feeding ducts (10) extend between said auxiliary assembly (9) and said molding cavity (7), said feeding ducts (10) comprising initial segments (11a) engaged with said auxiliary assembly (9) and final segments (11b) engaged with said molding units (3) and removably connected to said initial segments (11a), and wherein said check means (20) comprises shut-off devices (20a) connected to said final segments (11b) and adapted to prevent said pressurized fluid from flowing back to said molding cavities (7).

3. Apparatus according to claim 2, wherein said shut-off devices (20a) comprise at least one stop valve (21) adapted to prevent the pressurized fluid from flowing back from said molding cavity (7), and at least one manually operated discharge valve (22) for said fluid.

4. Apparatus according to claim 3, wherein said final segments (11b) comprise a discharge portion (23) connected to said discharge valve (22), and wherein said discharge valve (22) is an electric valve.

5. Apparatus according to claim 2, wherein said removable connecting devices comprise a quick-connection device (12) inserted between said initial segments (11a) and said final segments (11b).

6. Apparatus according to claim 1, wherein supplying channels (18) extends between said injection assembly (8) and molding cavity (7), and wherein said removable connecting devices comprise, in said supplying channels (18), at least one movable injector (8a) located between said injection assembly (8) and said molding units (3).

7. Apparatus according to claim 6, wherein said check means (20) in said supplying channels (18) comprises one-way elements (20b) for the plastics materials.

8. Apparatus according to claim 7, wherein said one-way elements (20b) are formed by at least one conical channel (24) made in said molding units (3).

9. Apparatus according to claim 7, wherein said one-way elements (20b) are formed by at least one stop valve.

10. Apparatus according to claim 1, wherein said injection assembly (8) and said auxiliary assembly (9) are substantially stationary, and wherein said molding units (3) are movable along a substantially closed-loop path (25).

11. Apparatus according to claim 10, wherein working stations are provided along said path (25), said working stations comprising plastics material injection and pressurized fluid supplying (26), cooling (27, 28, 29), pressurized fluid discharging and demolding (30) stations.

* * * * *